Dec. 26, 1933.   V. MULHOLLAND   1,941,410
GLASS MELTING FURNACE
Filed Nov. 9, 1929   4 Sheets-Sheet 1

Witness
W. B. Thayer

Inventor;
Vergil Mulholland,
by Brown & Parlaw
Attorneys

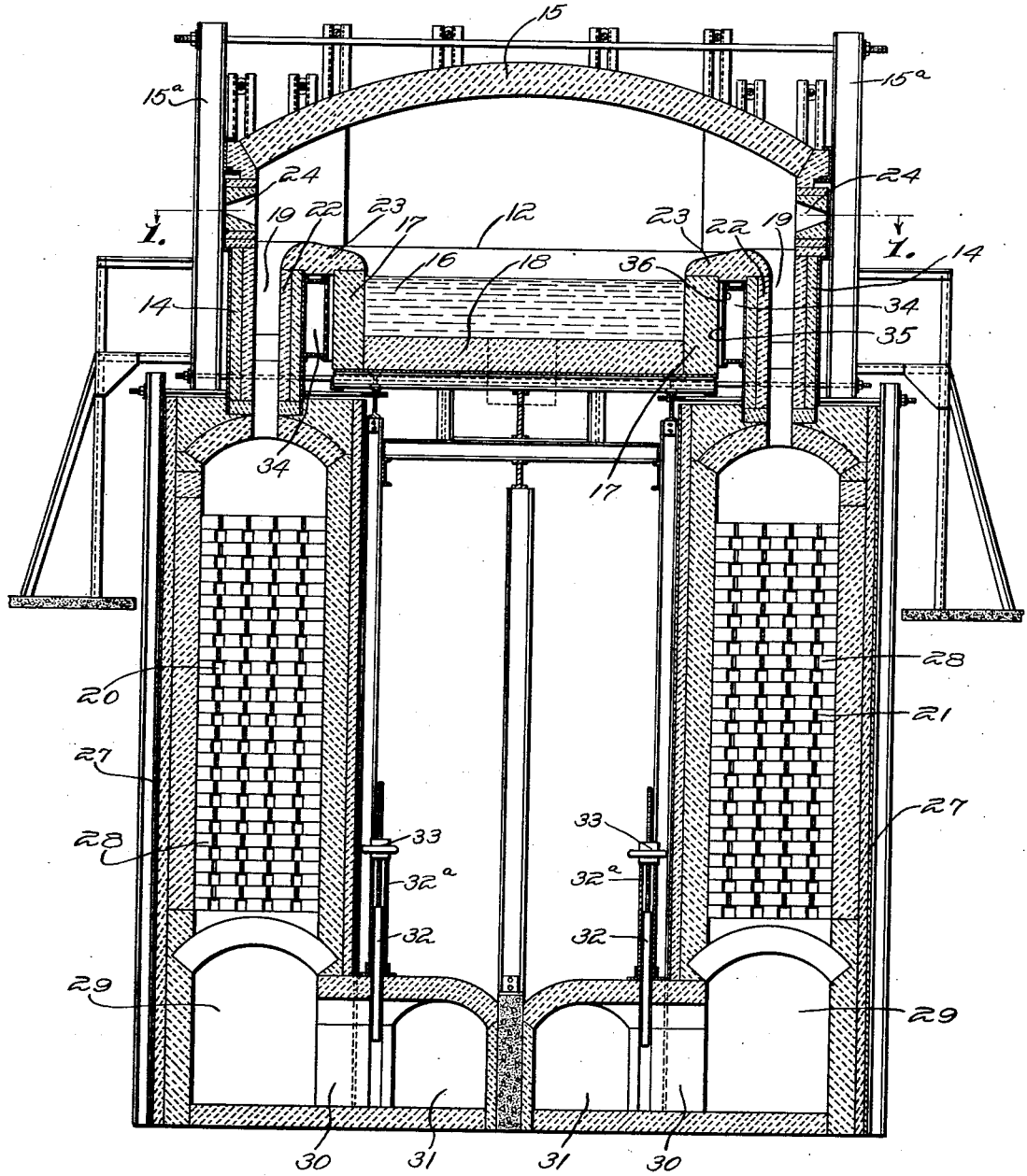

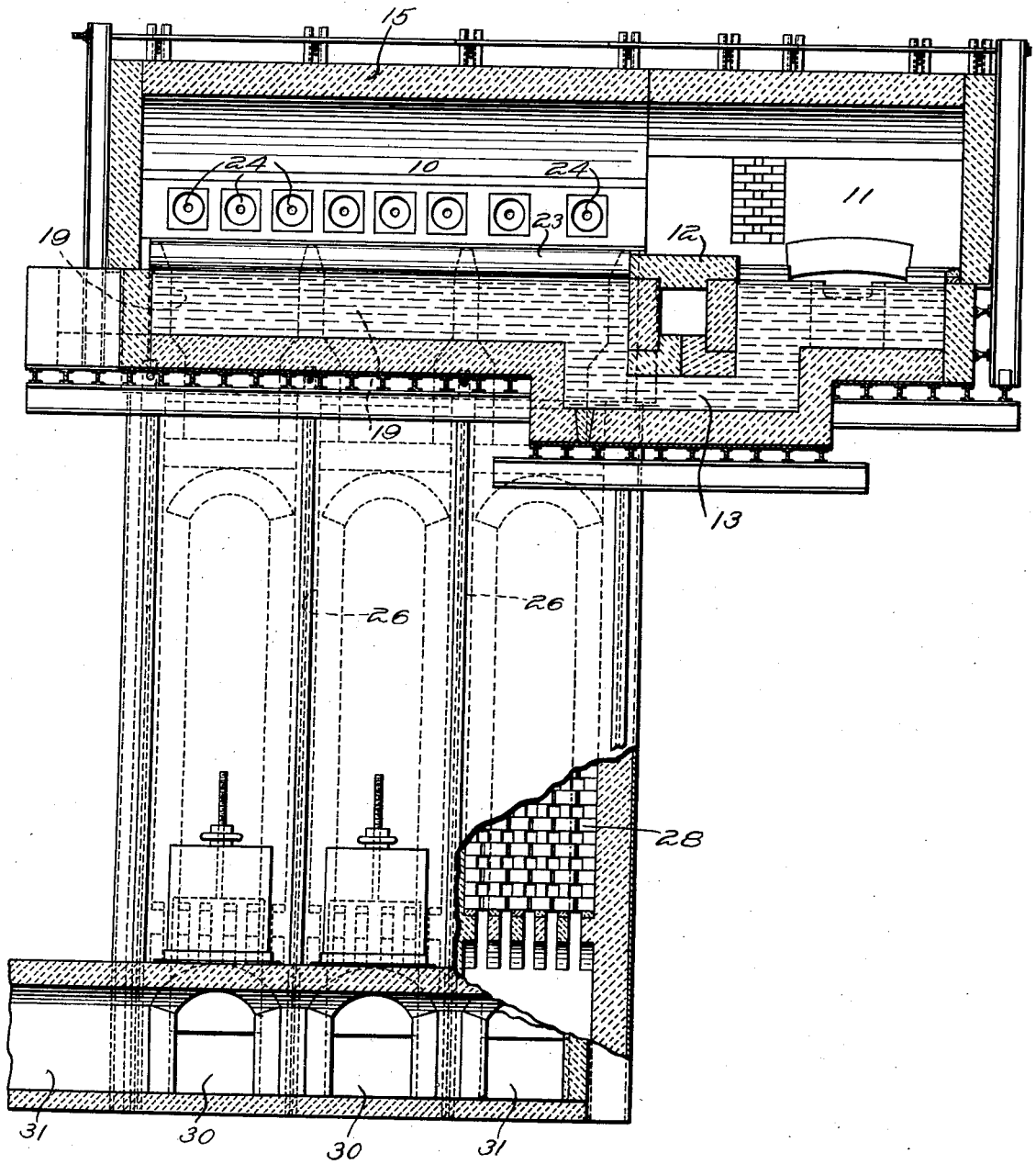

Dec. 26, 1933.  V. MULHOLLAND  1,941,410
GLASS MELTING FURNACE
Filed Nov. 9, 1929    4 Sheets-Sheet 4

Witness;
W. B. Thayer.

Inventor;
Vergil Mulholland
by Brown + Canham
Attorneys

Patented Dec. 26, 1933

1,941,410

UNITED STATES PATENT OFFICE 1,941,410

GLASS MELTING FURNACE

Vergil Mulholland, West Hartford, Conn., assignor to Hartford-Empire Company, Hartford, Conn., a corporation of Delaware Application November 9, 1929. Serial No. 405,975

16 Claims. (Cl. 49—54)

My invention relates to glass melting furnaces, particularly those of the regenerative type.

In general, I propose a novel and efficient arrangement of parts in such a furnace whereby I am enabled readily and efficiently to provide a substantially continuous blanket of flame over the glass melting and to be melted, and to avoid hot and cold spots longitudinally of the bath of glass, and hence to assure a more efficient melting and conditioning of the glass than has heretofore been possible.

My arrangement provides for economies in fuel and prevents losses often occurring from the improper application of flame to the glass bath.

In the usual glass melting furnace of the prior art, particularly those that are fired by liquid or gaseous fuel, as oil or natural gas, it has been customary to provide regenerators on either side of the melting chamber, the flues from which enter through horizontal conduits into the side wall above the glass line. It has been usual to arrange the fuel ports in relatively widely spaced relation along the sides of the tank, and the burners have often been in inaccessible positions which has rendered their ready individual control difficult. The arrangements of the prior art have been such that, often the efficient manipulation from a fuel standpoint, namely, the use of substantial neutral flame, has resulted in the application of flame at one or more local spots longitudinally of the glass and has therefore resulted in hot and cold spots alternately in the glass.

Also the prior practice above described has resulted in the projection of the fuel into the furnace immediately above the outer or side portions of the glass bath, and combustion has hence taken place at a point removed inwardly from these side walls, frequently leaving cool zones under the burners and adjacent to the side walls. This condition is necessitated because of the design in the prior art structures, as the burners cannot well be removed from the outer edge of the pool without removing them back into the regenerator flues, which is impractical, both as the combustion taking place in the flues is inefficient and is destructive of the flues themselves.

In order to properly melt and condition glass in a continuous furnace in which the batch is fed in at the rear end in the usual way and progresses forwardly through a melting zone and under a bridge wall into a refining or conditioning chamber, it is desirable to maintain throughout each cross section of the furnace, a substantially uniform temperature condition while maintaining a desired gradient longitudinally of the melting chamber. A desirable condition, in terms of temperature, to be maintained is one in which the temperature starting at a desired value at the rear of the melting tank increases regularly to a maximum at a point approximately one-third of the distance between the dog house and the bridge wall, and then decreases gradually and regularly from that point to the bridge wall. When considered in terms of energy released, rather than temperature maintained, the curve longitudinally of the tank is somewhat different as the fresh batch coming from the dog house absorbs far greater energy than the nearly refined glass which passes under the bridge wall.

Hence, the greatest amount of energy should usually be released over the incoming batch where the fusion takes place, so that the energy curve rearwardly of the point of highest temperature may be substantially flat or slightly ascending. After fusion is complete, which occurs approximately at the point of highest temperature, the energy required falls rapidly, after which the curve again flattens out in a lower plan.

These desirable characteristics in the temperature curve and the energy curve cannot be efficiently maintained save by the application of heat at closely spaced intervals, so that the flame constitutes substantially a continuous blanket above the glass in the melting compartment. The presence of hot and cold spots longitudinally of the furnace is fatal to the preservation of these highly desirable, and in fact almost essential, temperature and energy conditions.

In the prior art structures in which the fuel is supplied at widely separated intervals and in which the waste gases are removed at similarly widely separated intervals, it has been found necessary, in order to approach these desired temperature and energy conditions, to fire the furnace with a reducing or "smoky" and defused flame. The use of such a flame, while permitting successful operation of furnaces of the prior art, is obviously quite wasteful, as the fuel supplied is not completely burned and is carried off in smoke from the smoke stack.

Also heretofore in the regenerative glass melting furnaces of the prior art, it has been the practice to construct the regenerators entirely of brick. Such structures are not air-tight, and hence during operation, tend to draw in atmospheric air leaking through the walls which tend to cool the gases and air in the regenerators and reduce their efficiency. Not only is this true, but it has been found in practice that no two regenerators, even if built from precisely the same drawings, "breathe" or leak to the same extent, and hence a pair of such regenerators "breathing" differently tend to unbalance the conditions in the furnace upon reversals.

An object of my present invention is to provide a regenerative glass melting furnace in which the difficulties above recited of the prior art are not present, or are greatly minimized and in which readily accessible means are provided for projecting fuel and for taking off waste gases into the regenerators in a manner which permits the use of a continuous blanket of substantially neutral flame, together with means for controlling the character and intensity of this flame throughout any longitudinal portion of the blanket, and thus assuring a suitable temperature gradient and the release of energy in desired quantities longitudinally of the melting chamber.

Another object of my invention is to provide a furnace of said type in which the fuel enters at a point removed from the sides of the glass bath and meets its air of combustion in such a manner that sufficient combustion takes place above the outer edges of the glass bath so that cool zones at the edges of the glass bath are eliminated.

A further object of my invention is to provide regenerators so constructed and enclosed as to prevent "breathing", to assure their greater efficiency and to prevent unbalancing of the heat conditions in the tank by reason of different degrees of leakage of air into the two regenerators of a pair.

A further object of my invention is to provide a furnace of the above described type in which the regenerator flues enter the furnace in a manner which not only permit a suitable arrangement of the burner ports to accomplish the objects above-mentioned, but by making the most direct connection possible with the melting chamber, assure greater efficiency of the regenerator system.

A further object of my invention is to provide, in a furnace of the character described, a novel and efficient means for positively cooling the walls of the glass containing portion of the furnace.

A still further object of the invention is to provide such a design of regenerative glass melting furnace as will permit a burner arrangement requiring the least possible openings in the walls of the tank, so that no induced air is admitted at the burner ports, or otherwise than through the regenerators. By such an arrangement, the introduction of undesirable and uncontrolled quantities of air is prevented.

A further object of my invention is to provide a furnace of the class described in which the application of heat at selected points longitudinally of the furnace may be controlled, not only by control of the fuel, but by selection of the extent of operation of portions of the regenerator system. More specifically, it includes the provision of a pair of regenerators divided into zones longitudinally of the tank and provided with individual damper controls for the several zones, whereby the extent of operation of those portions of the regenerators associated with any zone may be selectively controlled.

Other and further objects of the invention will appear from the following specification when considered in connection with the attached drawings, in which Figure 1 is a horizontal sectional view of a tank embodying my invention, the view being taken on the line 1—1 of Fig. 2, but certain parts being shown as broken away to disclose the structure therebeneath;

Fig. 2 is a vertical cross section taken on the line 2—2 of Fig. 1;

Fig. 3 is a longitudinal vertical section of the apparatus taken on the line 3—3 of Fig. 1, certain parts, however, being broken away to show other parts therebeyond;

Figure 1:
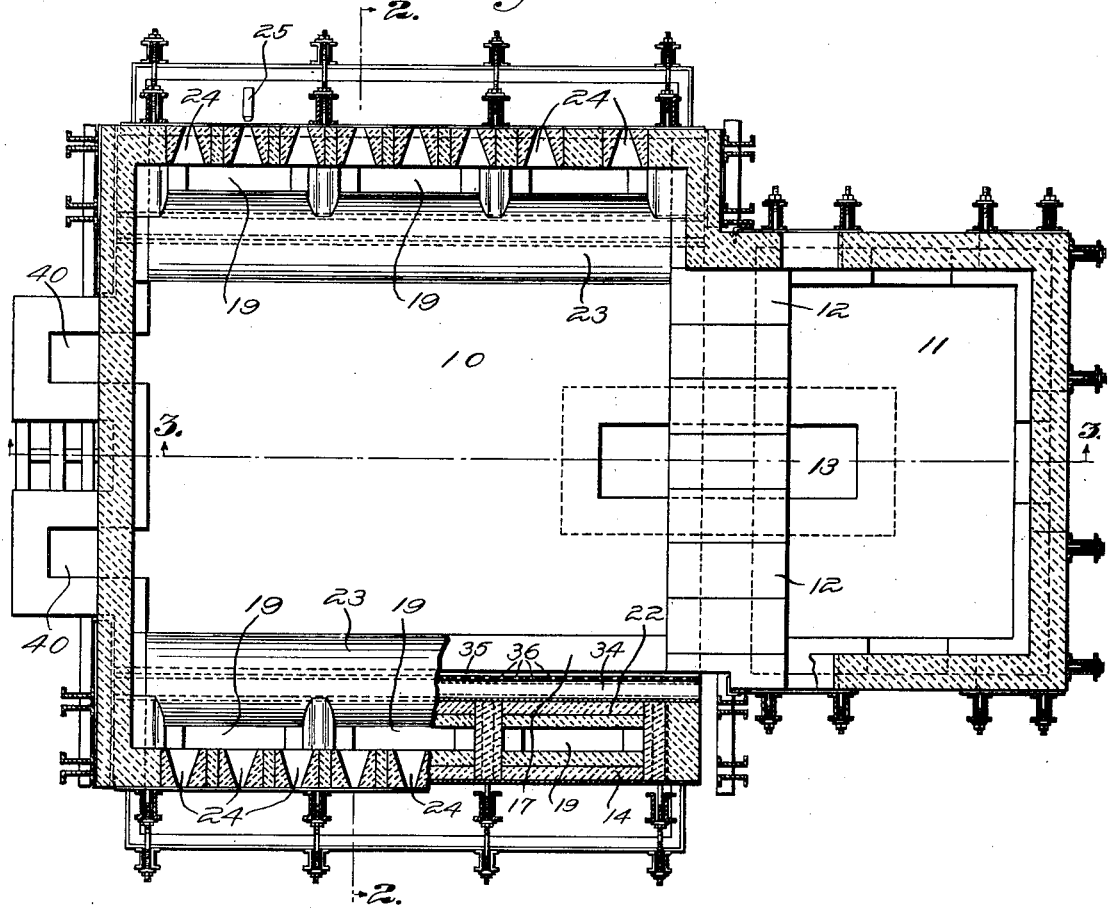

Referring to Figs. 1 to 4 inclusive, I have shown my invention as embodied in a melting furnace comprising a melting chamber 10 as a refining or conditioning chamber 11, which chambers are separated by a bridge wall 12 and communicate below the surface of the glass by a throat 13. The melting compartment 10 has side walls 14 and a crown 15, the structure being maintained and supported by the usual buck stays 15ª. A glass containing basin 16 having side walls 17 and bottom 18 of flux blocks of the usual character, is contained within the walls 14 and the crown 15, the side walls 17 being spaced from the walls 14 to provide for the entry between these walls of the regenerator flues 19.

A pair of divided regenerators 20, 21 are provided below the outer edges of the melting chamber and communicate with the melting chamber by the flues 19, the outer walls of which, constitute the lower portion of wall 14 of the melting chamber. The inner walls 22 of the flues 19 are spaced from the walls 17 of the glass containing basin. These walls carry a suitable refractory cover 23 preferably shaped as shown in Fig. 2. Above the upper end of the flues 19, the side walls 14 of the melting chamber are provided with a series of burner openings 24 which are spaced longitudinally of the melting chamber throughout the length thereof. These openings are preferably close together and are provided for a plurality of burners 25 adapted to project fuel into the furnace.

Figure 4:
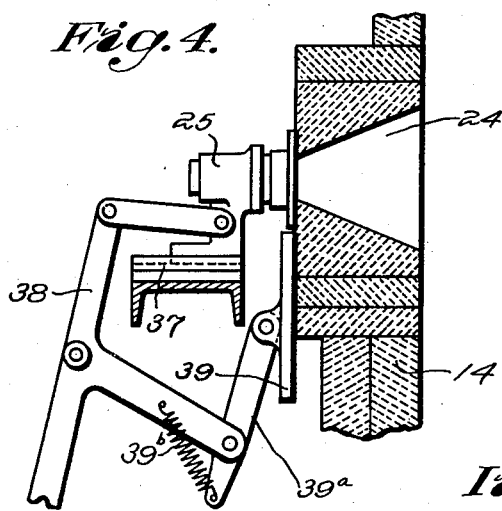
Fig. 4 is an end view of means for mounting and moving the burners and port closures.

The openings 24 may be sealed against admission of induced air as by the arrangement of parts shown in Fig. 4. I also preferably provide means for alternately removing the burners from the two sides of the furnace and applying a closure to the ports, thus preventing injury to the burners while they are not in operation, and at the same time assuring the maintenance of the proper pressure control within the furnace. Thus I mount burners 25 on suitable slideways 37 and provide means, including lever 38, for sliding the burners away from the openings 24. A closure plate 39, preferably of refractory material or having a refractory facing, is mounted on the lever 39ª connected to the lever 38. A spring 39ᵇ forces the plate into contact with the furnace wall. By this arrangement, movement of the lever 38 to withdraw the associated burner 25 from the port serves also to move the closure 39 into place to close the port.

By the arrangement shown and described, it is obvious that the burners are readily accessible and may be spaced, as desired, longitudinally of the furnace without interference from the regenerator arrangement. The burners are provided with suitable control means as valves (not shown) whereby they may be individually regulated to supply suitable amounts of fuel at the several points longitudinally of the furnace.

The regenerator flues 19, as shown best in Fig. 1, in effect constitute substantially continuous flues extending the entire length of the melting chamber, the continuity of the flues being only interrupted by the partitions which divide the regenerators into sections, as hereinafter described. It is obvious, from what has been said, that by this arrangement of an adequate number of closely spaced burners and of flues which extend substantially the entire length of the melting chamber, the furnace may be readily fired by a substantially neutral flame which will cover the entire surface of the glass and that the intensity of this flame may be accurately regulated to give any suitable longitudinal heat gradient and energy curve. As the burners and the flues 19 are both spaced laterally beyond the glass containing wall 17, and as the fuel and air meet well beyond the edges of the glass containing basin, the combustion may be sufficiently complete at points adjacent the edges of the basin to fully heat the edge portions of the glass and prevent cool zones in such portions.

The regenerators 20 and 21 extend substantially the entire length of the melting chamber 10 and one of them is provided on either side and below the chamber. Each of these regenerators is divided longitudinally by vertical partitions 26, and thus, in effect, constitute a plurality of separately controllable regenerators formed as a single unit. This unit is preferably enclosed in a steel jacket 27 which prevents "breathing", thus increasing the efficiency of the regenerators and assuring uniformity of action of cooperating sections of the two regenerators. Each of the regenerator sections is provided with the usual checkers 28, a flue 19 communicating with the melting chamber and an intake and exhaust flue 29. The intake and exhaust flue 29 of each section of each regenerator communicates through a passage 30 with a common flue 31 through which the gases are exhausted and fresh air alternately taken in to each regenerator. Each passage 30 is controlled by a gate damper 32ª mounted on a suitable bracket 32 and provided with a nut and screw positioning means 33 by which the extent of opening of each passage 30 may be regulated as desired. By this arrangement, any section of each of the regenerators 20 or 21 may be optionally thrown into and out of operation either wholly or partially, and by this means, a further efficient regulation or zone control of the heat condition longitudinally of the melting chamber may be obtained. Aside from the unitary character of the regenerators, the division of these unitary structures, the individual control of the several sections, the relative positioning of the regenerators and the melting chamber, and the means for preventing breathing, the regenerators may be of any desired and well-known construction.

In the form shown in Figs. 1 to 4 inclusive, the flues 19 extend vertically from the regenerators directly into the tank, thus providing a short and direct connection between the furnace and the regenerators, which arrangement tends to higher efficiency. This construction, as it renders the side walls 17 of the glass containing basin inaccessible for hot repairs, requires the application of efficient means for cooling the outer surface of these walls. I have, therefore, provided such a means which not only constitute a novel and efficient cooling means, but also serve as supports for the walls themselves. In the space between the inner walls 22 of the flues 19 and the walls 17 of the basin, I provide hollow metal boxes 34 having connections with a suitable source of air under pressure. These boxes may be mounted flush with the walls 22, but are spaced from the wall 17 by vertical flanges or ridges which provide a series of downwardly openings spaces 35 between the face of the boxes and the walls 17. The upper portions of the boxes are provided with openings 36 facing the wall 17, so that air forced through the boxes passes through the openings 36 to the walls and then scrubs downwardly in the spaces 35 and effectively cools the side walls 17 in a most efficient manner, the cooling air first coming into contact with the wall is applied where it is most needed, namely, opposite the glass line in the basin and the air as it becomes warmer, passes downwardly and escapes from the lower ends of the spaces 35.

Figure 5:
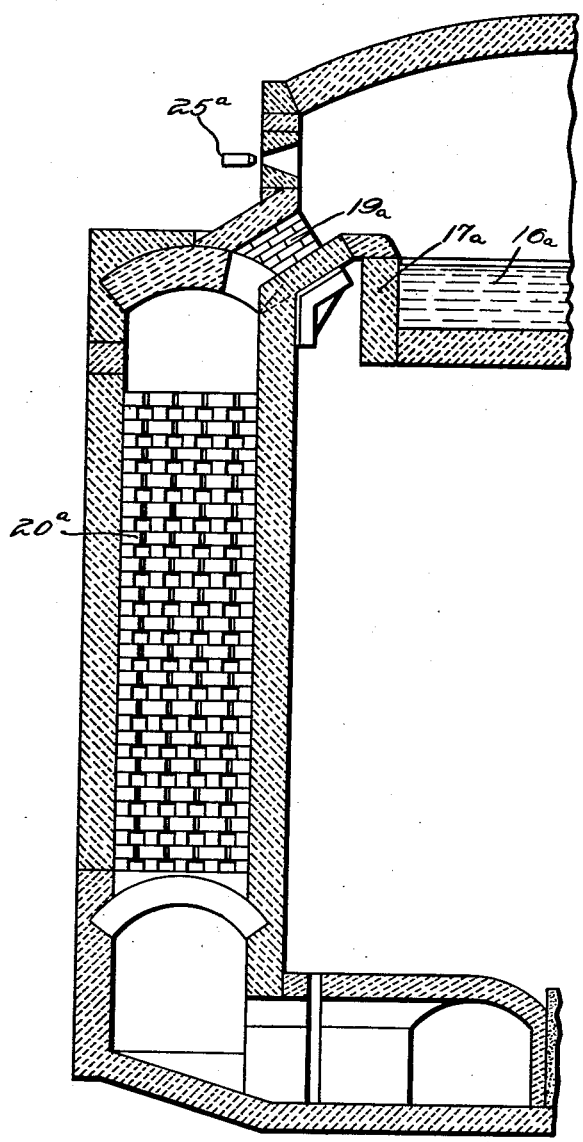
Fig. 5 is a partial view similar to Fig. 2, but showing a modified arrangement of regenerators and furnace.

In the modification of my invention shown in Fig. 5, the general construction of the furnace is the same as that heretofore described, save that the regenerators, of which but one, 20ª, is shown, are offset laterally from the furnace, and are somewhat higher than in the form of Figs. 1–3. These regenerators, however, are not high enough to interfere with the accessibility of the burners 25ª or with the provision of the desired number of closely spaced burners. The flues 19a in this form do not rise vertically, as in the previously described form, but constitute very short flues entering the furnace at an angle, as shown, below the fuel ports. The construction shown in Fig. 5 has the advantage of rendering the walls 17a of the basin 16a accessible for hot repairs and permits them to be cooled in the usual manner and without special provision. Also, the introduction of air from the regenerators by means of the flues 19a may prove more efficient in the firing system because of the angle at which the incoming air enters the furnace. While there may be some tendency toward a reduction in efficiency of the regenerator system because of the lateral spacing of the regenerators and the exposure of the flue 19a to a slightly greater extent than the flue 19, this tendency is compensated for by the shortness of the flue 19a. In the Fig. 5, I have not illustrated the insulation illustrated in Fig. 2 and surrounding the regenerator. Obvious, insulation may be applied as desired and the regenerator of Fig. 5 may be encased in a steel jacket to prevent leakage as in the previously described form. I may, however, if desired, omit the steel jacket about all or parts of the regenerator system and apply to the outer surface thereof any impermeable paint or coating which is resistant to high temperatures and which will effectively prevent the breathing of the regenerator system. Such a paint may be made from a mixture of barium sulphate and silicate of sodium.

In the operation of the apparatus of either form shown in this application, a bath of glass is maintained in the basin 16 and fresh batch is constantly supplied to the bath through the dog-houses 40. The burners, in proper number on one side of the furnace, are suitably regulated to supply the quantity of fuel at the various points longitudinally of the flues and the regenerators are adjusted to give the proper draft and to supply proper quantities of air so as to preferably maintain a smooth heat gradient longitudinally of the furnace and to substantially cover the entire melting chamber with a flame blanket. Thus, cold spots in the glass are avoided. The fusing of the raw batch and the refining of the glass takes place at the proper times and in distinct zones, and the glass moves forward as glass is constantly worked out of the conditioning chamber 11. At the end of a suitable period, the furnace is reversed, as is the usual practice, the burners and regenerators on the opposite sides having been suitably adjusted to maintain the desired condition. As the flame breaks at a point displaced laterally from the edge of the bath, no cool spots develop on the edges of the bath, and as the flame covers all portions of the bath and may be accurately regulated, no cool spots longitudinally of the bath develop. Preferably a proportion of air to fuel supplied by the system is maintained such that a neutral flame is maintained and the furnace is thus worked to the highest efficiency and the glass melted at the minimum expense. By reason of the provisions to prevent "breathing" of the recuperator system, the recuperators not only work at their highest efficiency, but upon reversals, the desired conditions remain balanced.

I have referred in the specification, and will refer in the claims, to a "neutral fire" or "neutral flame". By this term, I intend to define a flame of relatively high efficiency which is neither a reducing flame nor an oxidizing flame. By the use of the term, I do not wish to limit myself to a flame or a fire in which the proportions of fuel and air are precisely and mathematically the proper proportions for a flame which will neither reduce nor oxidize to any extent, but this term is to be understood as distinguishing from a flame which is appreciably cooled by an excess of air or in which there is an appreciable waste of fuel from an excess of fuel supply.

Obviously, the apparatus shown and described may be modified in numerous particulars without departing from the spirit of my invention, and various modifications of the method suitable under special circumstances may be practiced without departing from the spirit of the invention.

Having fully described my invention, I claim:

1. The method of making glass which comprises, maintaining a bath of glass in the melting end of a continuous glass melting furnace, creating a substantially neutral flame completely covering the bath by the use of a substantially continuous sheet of air across the tank into which the fuel is injected at relatively short intervals along the side of the bath, and regulating the flame so applied to maintain regular variations in the temperature conditions longitudinally of the bath and uniform temperature conditions laterally thereof.

2. The method of making glass continuously which comprises, supplying glass making batch to one end of a bath of glass, removing the glass from the other end of the bath, creating a neutral flame blanket completely covering the bath by the use of a substantially continuous sheet of air across the tank into which the fuel is injected at relatively short intervals along the side of the bath, and regulating the flame so that the curve of temperature longitudinally of the bath is a smooth one ascending during approximately the first third of the bath and descending thereafter and the temperature conditions laterally of the bath are maintained uniform.

3. The method of making glass which comprises, maintaining a bath of glass in a melting chamber, feeding batch into one end of the bath, creating a continuous blanket of neutral flame above the glass and batch by the use of a continuous sheet of air across the tank into which the fuel is injected at relatively short intervals along the side of the bath, and regulating the flame to maintain the maximum temperature of the glass at a point between one-quarter and one-half of the distance from the bath feeding end to the opposite end of the bath in the melting chamber, and gradually lessening temperatures from that point to both ends of the bath.

4. In a regenerative glass melting furnace, a melting chamber, a glass containing basin therein, regenerators, flues from the regenerators extending substantially the entire length of the melting chamber, fuel ports opening into the melting chamber above the basin and above and outside of the ends of the flues, said fuel ports being sufficiently numerous to maintain a continuous blanket of neutral flame over the glass.

5. In combination in a regenerative glass melting furnace, regenerators, a tank having a melting and a refining end, means for passing a blanket of flame over the entire surface of the glass contained in the melting end, means for varying the amount of air supplied to the furnace, and means for preventing leakage into the regenerators and thereby maintaining substantially even the amount of air entering the furnace through cooperating regenerators.

6. A regenerative glass melting furnace comprising a melting compartment, a glass container therein, fuel ports located longitudinally of the compartment, regenerators having flues entering the furnace below said ports and between the ports and the container and extending without substantial interruption the length of the container, whereby flame may be spread in a blanket over the surface of the glass contained in the container.

7. In a glass melting furnace, a chamber for melting glass, fuel ports, regenerators, and a plurality of vertical ports from the regenerators entering the melting chamber above the glass level but below and in front of the fuel ports.

8. In a glass melting furnace, fuel ports, regenerators, a plurality of vertical flues from the regenerators entering the melting chamber above the glass level but below and in front of the fuel ports, and a crown covering the whole.

9. In a glass melting furnace of the regenerative type, a glass containing basin, regenerators therebelow, vertical flues from the regenerators entering the furnace adjacent the side walls of the basin and wholly within the furnace, fuel ports entering the furnace laterally beyond and above the ends of the flues and a crown covering the basin and extending laterally beyond the regenerator flues.

10. In combination in a regenerative glass melting furnace, a melting chamber, a glass containing basin therein, regenerators, vertical flues from the regenerators to the chamber, cooling boxes between and adjacent to the container and the vertical flues, a plurality of fuel ports in the wall of the chamber immediately above the vertical flues, and a crown covering the whole.

11. In a regenerative glass melting furnace, a melting chamber, a glass containing basin therein, regenerators below the melting chamber, vertical flues in the melting chamber extending from the regenerators to the top of the basin, side walls of the furnace therebeyond, and fuel port blocks mounted in the side wall above the level of the glass.

12. A regenerative glass melting furnace comprising side walls and a crown, fuel ports mounted in the side walls, a glass container within the walls, regenerators below the level of the bottom of the container, and flues from the regenerators entering the furnace vertically between the walls of the furnace and the walls of the container and terminating below the fuel ports.

13. In a regenerative glass melting furnace, a glass containing basin, regenerators, cooling means adjacent the basin, flues from the regenerators adjacent the cooling means, side walls of the furnace adjacent the flues, and fuel ports located in the side walls of the furnace.

14. In a glass melting furnace, a glass container, cooling means for the container walls comprising a hollow steel box having an end connected with a source of air under pressure, openings in the upper portion of the side of said box adjacent the container at the level of the glass therein, separating and supporting elements spaced along said container to prevent air from moving longitudinally thereof and to support the container whereby the cooling air is directed first against the hottest part of the container walls and moves thence downwardly.

15. In a regenerative glass melting furnace, a glass container, regenerators therebelow, cooling means adjacent the container comprising means for directing cooling air downwardly against the walls of the container, flues from the regenerator to the furnace, the outer wall of said flues comprising part of the outer wall of the furnace, and fuel ports mounted above the flue walls.

16. In a regenerative glass melting furnace, a melting chamber, a glass containing basin therein the lateral sides of which are spaced inwardly of the sides of said chamber, regenerators associated with said melting chamber, fuel ports opening into the melting chamber above said basin, and flues extending substantially the entire length of said melting chamber and communicating therewith at substantially right angles to the direction of introduction of fuel through said ports, said flues communicating between said melting chamber intermediate the lateral sides thereof and the lateral sides of said basin on the one hand and said regenerators on the other, and the fuel ports being sufficiently numerous to supply fuel to the substantially continuous sheet of air entering the melting chamber from the flues at one side thereof to produce a continuous blanket of flame over the entire surface of glass in said basin.

VERGIL MULHOLLAND.